(12) United States Patent
Dent et al.

(10) Patent No.: US 6,181,920 B1
(45) Date of Patent: Jan. 30, 2001

(54) TRANSMITTER THAT SELECTIVELY POLARIZES A RADIO WAVE

(75) Inventors: Paul W. Dent, Pittsboro; Gregory A. O'Neill, Jr., Apex, both of NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 08/954,103

(22) Filed: Oct. 20, 1997

(51) Int. Cl.⁷ .............................. H03C 7/02; H04B 1/02; H04B 1/66; H01Q 21/00
(52) U.S. Cl. .................... 455/101; 455/101; 455/102; 455/103; 343/853
(58) Field of Search ...................... 455/101, 102, 455/103, 127, 343; 370/321, 336, 337, 334, 442, 347; 343/853

(56) References Cited

U.S. PATENT DOCUMENTS

| | | | |
|---|---|---|---|
| 2,756,418 | * 7/1956 | Duane, Jr. | 342/361 |
| 3,148,367 | * 9/1964 | Ochiai | 342/181 |
| 3,354,459 | * 11/1967 | Schwartz | 342/362 |
| 3,882,393 | 5/1975 | Epstein | 325/56 |
| 3,956,699 | * 5/1976 | Leahy | 325/15 |
| 4,107,678 | * 8/1978 | Powell | 343/17.5 |
| 4,968,969 | 11/1990 | Drabowitch et al. | 342/188 |
| 5,025,485 | * 6/1991 | Csongor et al. | 455/12 |
| 5,351,016 | 9/1994 | Dent | 332/103 |
| 5,530,722 | 6/1996 | Dent | 375/298 |
| 5,584,057 | * 12/1996 | Dent | 455/101 |
| 5,659,322 | 8/1997 | Caille | 342/188 |

FOREIGN PATENT DOCUMENTS

| 479744A1 | 4/1992 | (EP) . |
|---|---|---|
| 0656697 | 6/1995 | (EP) . |

\* cited by examiner

Primary Examiner—Daniel S. Hunter
Assistant Examiner—Meless Zewdu
(74) Attorney, Agent, or Firm—Burns, Doane, Swecker & Mathis, L.L.P.

(57) ABSTRACT

A transmitter provides a radio wave with selectable polarization. The transmitter includes antenna feeds that generate orthogonal radio waves having non-linear polarizations that corresponds to the selectable phase relationships of a first and a second modulating signals. A spacial combination of the non-linear radio waves to produce a linearly polarized radio wave that has an orientation corresponding to a selected phase relationship.

25 Claims, 6 Drawing Sheets

TRANSMITTER THAT SELECTIVELY POLARIZES A RADIO WAVE

FIELD OF THE INVENTION

This invention generally relates to the field of transmitters, more particularly, to a transmitter that transmits selectively polarized radio waves.

BACKGROUND OF THE INVENTION

Radio terminals that communicate with orbiting satellites are gradually coming into commercial use. These terminals can communicate bi-directionally with direct broadcast TV and telephone satellite systems for providing communication services directly to households via dish antennas. In such communication systems, a satellite uses polarized radio waves (beams) to communicate with terminals located in a service area.

Satellite communication systems commonly use various types of radio wave polarization. A radio wave may be polarized linearly, for example, vertically or horizontally, or it may be polarized non-linearly, for example, elliptically or circularly. The polarization of a radio wave is defined by the direction in which electric vectors are aligned during at least one full cycle. Generally, both the magnitude and the direction of the electric vectors vary non-linearly during each cycle. Usually, such non-linearly varying electric vectors map out an ellipse on a plain normal to the direction of propagation at a point of observation. In this case, the non-linear polarization of the radio wave is said to be elliptical. The minor-to-major-axis ratio of the ellipse, which is expressed in decibels, is called the ellipticity of the radio wave. A linearly polarized radio wave has an ellipticity of infinity, that is, the minor-to-major-axis ratio is zero. A circularly polarized wave has an ellipticity of zero dB, that is, the minor-to-major axis ratio is unity. The linearly polarized wave is, therefore, defined as a transverse electromagnetic wave whose field vector at a point in a homogenous isotropic medium at all times lies along a fixed line. The circularly polarized wave is similarly defined as a electro-magnetic wave for which the electric and/or magnetic field vector at a point describes a circle.

A circularly polarized wave may have a right-hand circular polarization or a left-hand circular polarization. A right-hand circular polarization occurs when, for an observer looking in the direction of wave propagation, the rotation of the electric field vector in a stationary transverse plain is clockwise. Conversely, the rotation is counter-clockwise for a left-hand polarization. A circularly polarized wave may be produced by a helical beam antenna having a corresponding right-hand or left-hand sense. The circularly polarized wave may also be produced by the coexistence of two linearly polarized waves, such as a vertical and a horizontally polarized waves, each having the same amplitude but a 90° phase difference between them. If the linearly polarized waves are not equal in amplitude or have a phase difference other than a 90° relationship, the resulting radio wave will be polarized non-linearly. If for example, the amplitude of the vertical polarized wave is zero, the resulting wave is linearly polarized with a horizontal orientation. Further, if the two waves have equal amplitude but zero degree phase difference, the resulting wave is linearly polarized with a 45° orientation.

In order to better use the limited frequency spectrum allocated for offering satellite services, two different terminals communicating with the same satellite may use the same radio wave, but different polarization. For example, the same radio wave may have a horizontal polarization for communicating a modulated signal with one terminal and a vertical polarization for communicating the same or another modulated signal with the other terminal. Thus, it becomes necessary to selectively control the wave polarization in a terminal transmitter that transmits the modulated signals according to an allocated polarization.

FIG. 1A shows a conventional transmitter 10 for transmitting radio waves, which are selectively polarized either vertically or horizontally. The transmitter 10 includes a relatively high-power amplifier 12 for amplifying a modulated signal provided by a modulated signal generator 14. A polarization switch 16, which is controlled by a control signal on line 18, selectively connects the output of the power amplifier 12 to either a vertical input 20 or a horizontal input 22 of an antenna feed 24, which radiates a polarized wave with a selected vertical polarization or horizontal polarization. Because the high-power amplifier 12 must amplify the modulated signal to a full transmit power level, for example, 8 watts, the polarization switch 16 must be selected to withstand the full brunt of such a high power. A high-power active switch with a low loss, however, is expensive. Lower cost switches, on the other hand, introduce substantial loses of up to 20% of the amplifier's power. Consequently, an amplifier with higher power, i.e., 10 watt, must be used to accommodate the loss caused by the low cost switch. Alternatively, a mechanical switch may be used to perform the switching function. In addition to being bulky, however, such switches are subject to mechanical failures.

With the success of modern processing technologies in reducing the cost of power amplifiers more than the cost of high-power switches, another conventional transmitter 26, shown in FIG. 1B, uses two separate power amplifiers 28A and 28B, instead of the single switch and power-amplifier arrangement of FIG. 1, to eliminate the losses caused by a switching arrangement. Under the arrangement of FIG. 1B, however, only one power amplifier is enabled, via a controller 29, at a time. Because one power amplifier is idle half the time, the transmitter of FIG. 1B wastes the cost of one of the high-power amplifiers at any instance of time.

Therefore, there exists a need for a low-cost transmitter that can selectively transmit differently polarized modulated signals, without any loss ar waste of transmission resources.

SUMMARY OF THE INVENTION

Briefly, the present invention is exemplified in a transmitter that couples non-linearly polarized waves, which correspond to amplified modulated signals having a selectable phase relationship, to produce a linearly polarized wave with an orientation that corresponds to a selected phase relationship. In another embodiment, linearly polarized waves maybe coupled to produce circular polarization of either sense.

A transmitter according to an exemplary embodiment of the present invention includes a modulated signal generator, a first power amplifier, a second power amplifier, a first antenna feed, and a second antenna feed. The modulated signal generator generates a first modulated signal and a second modulated signal and is responsive to a control signal for selectively providing a predefined phase relationship between the first and second modulated signals. The first and second modulated signals are applied to the first and second power amplifiers, respectively. The first power amplifier, which has a first gain, amplifies the modulated signal and applies it to the first antenna feed. Similarly, the second power amplifier, which has a second gain, preferably, equal to the first gain, amplifies the second modulated signal and applies it to the second antenna feed. According to the present invention, the first antenna feed produces a first polarized wave having a first non-linear polarization. Similarly, the second antenna feed produces a second polarized wave having a second non-linear polarization. The polarization of the first polarized wave and the second polarized wave are selected such that, when jointly radiated they produce a third polarized wave having a linear polarization with an orientation that corresponds to the predefined phase relationship of the first and second modulated signals, as selected by the control signal.

In a second embodiment, a transmitter for producing either right hand or left hand circular polarization comprises a first transmit power amplifier driven at its input by a first modulated signal and coupled at its output to a first antenna feed that produces a fist polarized wave having a first linear polarization. A second transmit power amplifier is driven at its input by second modulated signal and coupled at its output to a second antenna feed structure that produces a second polarized wave having a second linear polarization, preferably orthogonal to the first linear polarization. A controller controls the relative phase of the first and second modulated signals such that the radio wave jointly radiated by the first and second antenna feed structures, is a circularly polarized wave in a desired sense with a power level equal to the sum of the power levels of said first and second power amplifiers. In an exemplary embodiment, the transmitter may selectively provide a left hand circularly polarized wave or a right hand circularly polarized wave.

In yet a third embodiment the two antenna feed structures provide linearly polarized radiation at angeles of +45° relative to a nominally vertical axis. The antenna feed are driven by respective power amplifiers such that either a vertically or horizontally polarized wave is produced having a power level equal to the sum of the power outputs of the two amplifiers. The power amplifiers are driven by respective modulated signals, which are controlled to drive the power amplifiers with a first relative phasing of 0° for example. Alternatively, the modulated signals may drive the power amplifiers with a second relative phasing 180° different from the first relative phasing, according to a selected vertically or horizontally polarized radiation.

Other features and advantages of the present invention will become apparent from the following description of the preferred embodiment, taken in conjunction with the accompanying drawings, which illustrate, by way of example, the principles of the invention.

DETAILED DESCRIPTION

Figure 2:
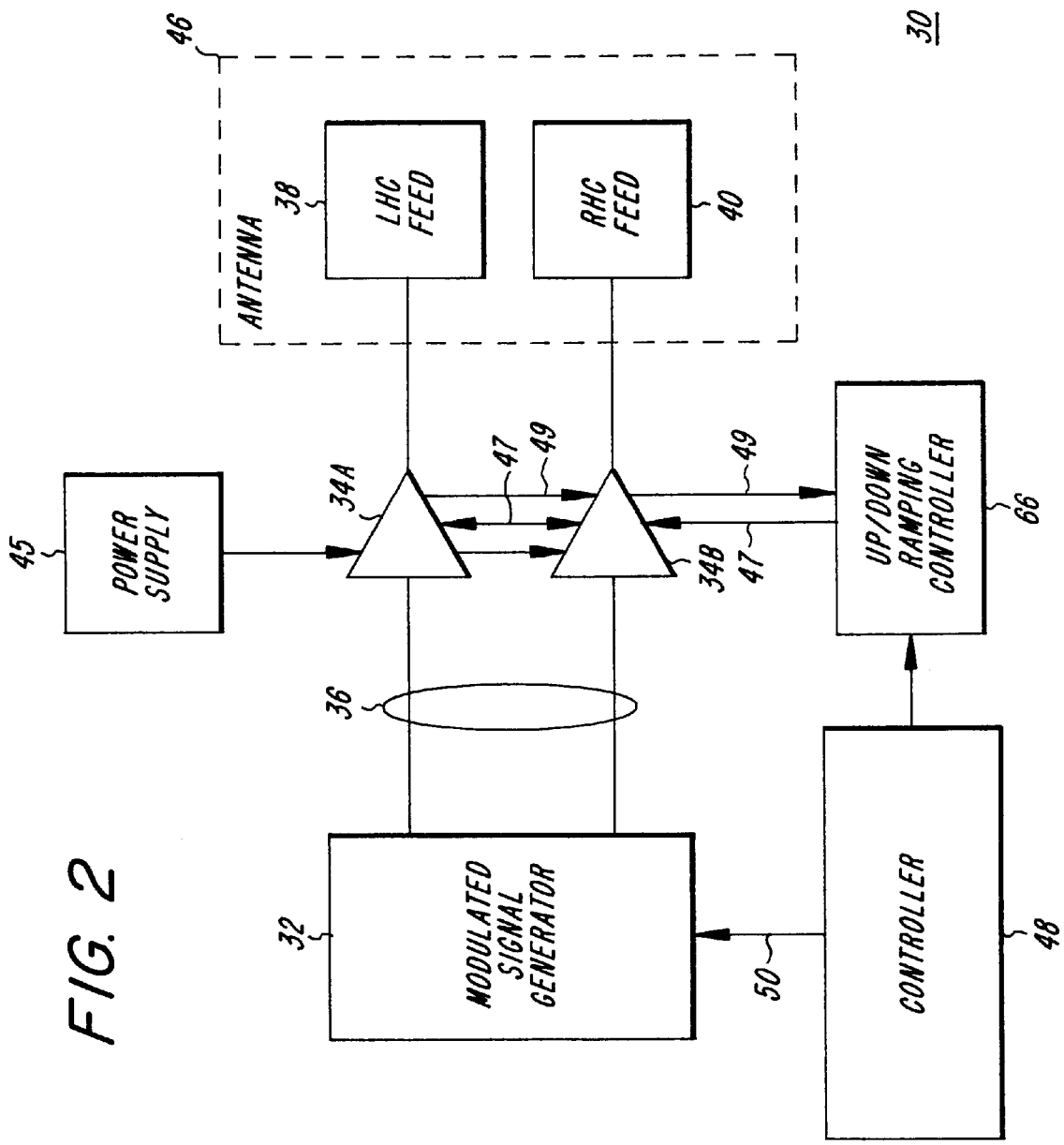
FIG. 2 is a block diagram of a transmitter according to one embodiment of the present invention.

Referring to FIG. 2, a transmitter 30 according to one embodiment of the present invention includes a modulated signal generator 32, a first and a second power amplifiers 34A and 34B, a left-hand circular (LHC) antenna feed 38 and a right-hand circular (RHC) antenna feed 40. The LHC and RHC antenna feeds (38, 40) can, for example, be located at the focus of a parabolic reflector. As is well known, two orthogonal circularly polarized feed points can be produced by using two linearly polarized feeds, such as crossed dipoles, that are coupled using a 90° coupler (not shown).

In an exemplary embodiment, the transmitter 30 is used in a communication satellite system that provides direct bi-directional satellite communication services to a household antenna. The modulated signal generator 32 generates a first modulated signal and a second modulated signal on lines 36. The modulated signal generator 32 is responsive to a control signal provided by a controller 48 on line 50 for selectively providing a predefined phase relationship between the first and second modulated signals. Preferably, the modulated signals have a quadrature phase relationship with respect to each other. For example, in response to the control signal, the phase relationship of the modulated signal may be selected to have a +90° or a −90° phase difference.

The first and second modulated signals are separately applied to the first and second power amplifiers 34A or 34B, respectively. The first power amplifier 34A, which has a first gain, amplifies the first modulated signal and applies it to the LHC feed antenna 38. Similarly, the second power amplifier 34B, which has a second gain, preferably, equal to the first gain, amplifies the second modulated signal and applies it to the RHC antenna feed 40. The LHC and RHC antenna feeds 38 and 40 cause radiated waves which combine in space to produce a net radiated wave having a different polarization than LHC or RHC. In an exemplary embodiment of the invention, the phase relationship of the modulated signals is selected to produce either a vertically polarized or a horizontally polarized radio wave.

The modulated signals produced by the modulated signal generator 32 are substantially identical modulated carrier signals and differ only in their relative phase relationship. In order to produce a vertically polarized wave, the phase relationship of the modulated signals are controlled, via the controller 48, in a way that the coupling of orthogonal radio waves generated by the LHC and RHC feeds 38 and 40 results in a vertical polarization, with horizontally polarized components being substantially cancelled because of the orthogonal relationship. On the other hand, in order to produce a horizontally polarized wave, the phases of the modulated signals are controlled to produce an opposite phase difference, i.e., 180°, from the phase relationship used for vertical polarization. In this way, the combination of the orthogonal radio waves generated by the LHC and RHC feeds 38 and 40 results in a horizontal polarization, with vertically polarized components being substantially cancelled. Because the phase relationship of the modulated signals is selectable under the control of the controller 48 the polarization of the transmissions from the transmitter of the invention can be selectively controlled.

Preferably, the power of the transmitted linearly polarized wave is equal to the sum of the powers of the first and the second power amplifiers 34A and 34B. Assuming equal power, the power of the transmitter is equal to twice the power of the power amplifiers 34A and 34B. For example, in order to transmit a radio wave with 8 watts of power, the first and second power amplifiers 34A and 34B should each be 4-watt power amplifiers. Structurally, the antenna feeds 38 and 40 may be located at the focus of a parabolic dish antenna, although other arrangements such as offset fed parabolas, crossed Yagi-uda arrays or crossed Log-periodic arrays may also be used.

It would be appreciated that, the application of the present invention is not limited to producing vertically or horizontally polarized waves. By controlling the phase relationship of the modulated signals, a net linear transmit polarization with any orientation can be produced. The linear polarization will have an orientation relative to a reference plane, e.g., the vertical plane, corresponding to one half of the relative phase of the modulated signals. For example, a 90° change in relative phase of the modulated signals would produce a 45° rotation in plane-of-polarization of the transmitted wave.

Figure 3:
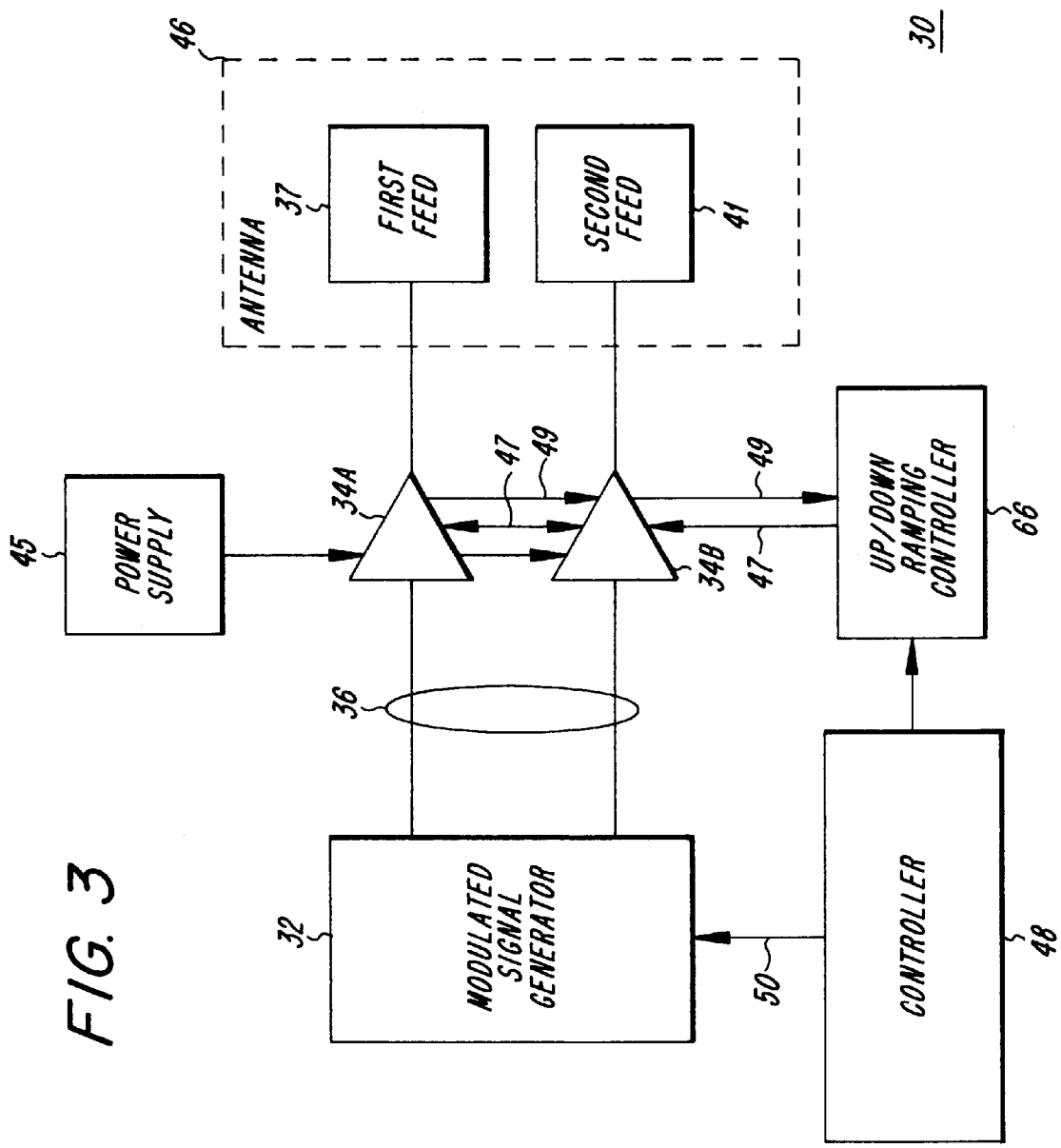
FIG. 3 is a block diagram of a transmitter according to another embodiment of the present invention.

Referring to FIG. 3, the transmitter 30 according to another embodiment of the present invention is shown. Similar to arrangement of FIG. 2, the transmitter 30 includes the modulated signal generator 32, the first and a second power amplifiers 34A and 34B, and two orthogonal antenna feeds 37 and 41. Instead of linear polarizations, however, the transmitter 30 according to this embodiment of the invention produces either a right hand or a left hand circular polarization. Under this arrangement, a first antenna feed 37 corresponds to a first linear polarization and a second antenna feed 41 corresponds to a second linear polarization preferably orthogonal to the first linear polarization. The controller 48 controls the relative phase of the modulated signals such that the radio wave radiated by the first and second antenna feed structures 37 and 41, when occurs in space, produce a circularly polarized wave with a desired sense. The relative phase of combination needed to produce circular polaration is ±90°. Similar to the arrangement of FIG. 2, the power level of the radio wave is equal to the sum of the power levels of the first and second power amplifiers.

In yet another embodiment, the first and second antenna feed 37 and 41 provide linearly polarized radiation at angles of ±45° relative to a nominally vertical axis. The antenna feed 37 and 41 are driven by respective power amplifiers 34A and 34B such that either a vertically or horizontally polarized wave is produced which has a power level equal to the sum of the power outputs of the two amplifiers 34A and 34B. The power amplifiers 34A and 34B are driven by the modulated signals, which are controlled to drive the power amplifiers with a first relative phasing of 0° for example, alternatively with a second relative phasing 180° different from the first relative phasing. In this way, vertically or horizontally polarized radiation is selectively produced.

In a Time Division Multiple Access systems, a TDMA transmitter is not activated to transmit continuously but rather is activated only to transmit in an assigned time-slot that recurs within a TDMA frame repetition period. Therefore, in order to employ the transmitter 30 of the invention, the activation and deactivation of the power amplifiers 34A and 34B must be ramped up or down smoothly to avoid undue spectral splatter into adjacent frequency channels. The transmitter 30, thus, includes an up/down ramping controller 66 which supplies an up/down ramping control signal on lines 47 to the power amplifiers 34A and 34B. A preferred method of up/down ramping is to control a bias voltage supplied from a power supply 45. The bias voltage is applied to the amplifiers 34A and 34B such that they consume a given instantaneous current from the supply 45. The current that is consumed by the amplifiers 34A and 34B is controlled to vary during an up-ramping period or a down-ramping period to cause the output powers of the amplifiers 34A and 34B to rise or fall in a desired manner. To assist in controlling the currents, a preferred method is to provide each power amplifier with a current monitor (not shown) that generates a feedback signal on lines 49 to the up/down ramping controller 66. At suitable triggering times, the controller 66 can ramp the current up or down in a fixed manner. To do this, the controller 66 may execute a ramping program that generates a sequence of digital control words representing the desired up/down ramping waveform. As is well known, in a TDMA system, a satellite terminal may be allocated more than one slot in a repetitive TDMA frame period. Multiple slots may be used, for example, to support simultaneous voice and data transmissions or to provide higher data rates or higher voice quality. The transmitter 30 allows the polarization to be independently selected for each slot of a multi-slot transmission according to the availability of slots and polarizations.

Figures 1A, 1B:
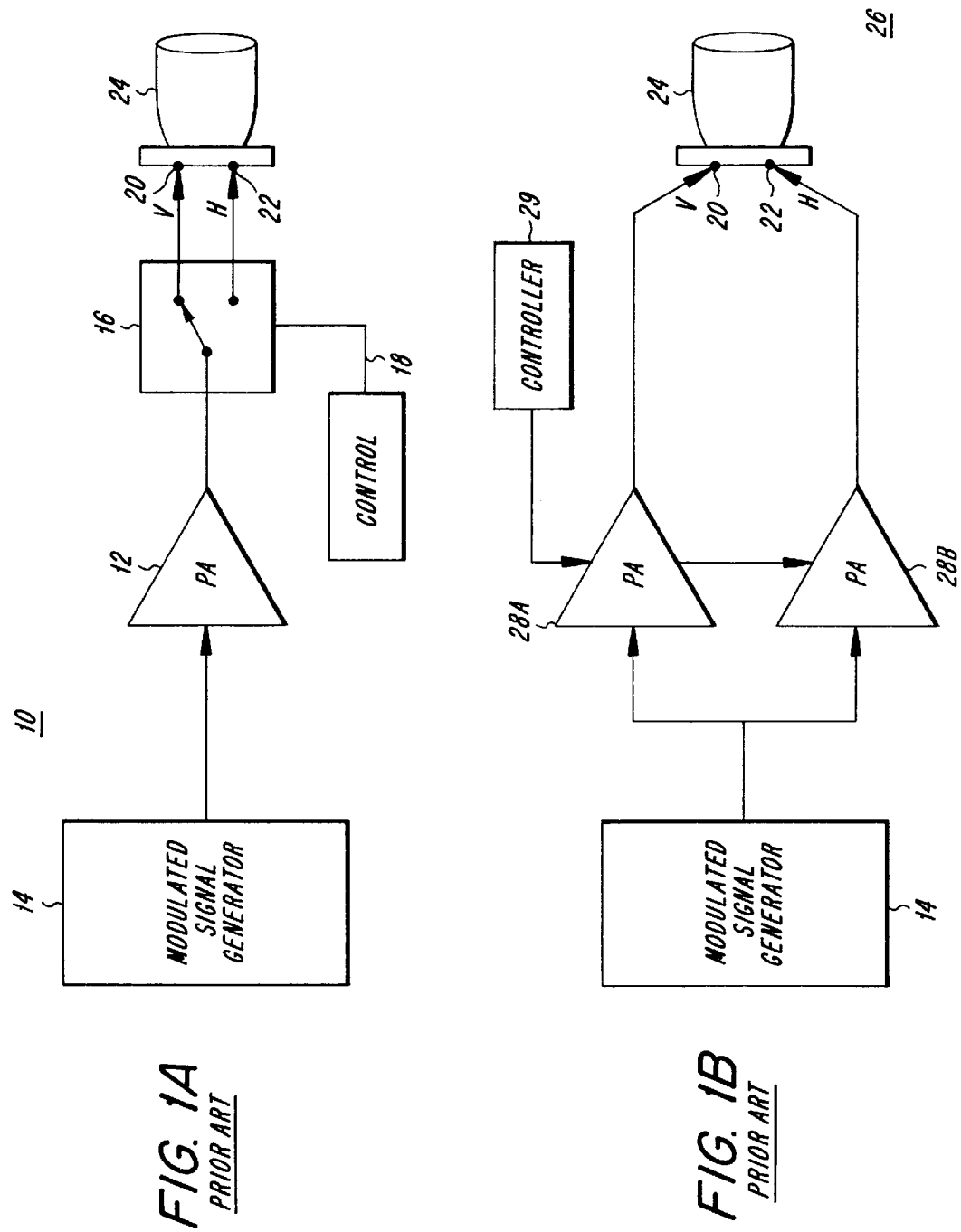
FIGS. 1A and 1B are block diagrams of conventional transmitters that transmit selectively polarized radio waves.
Figure 4:
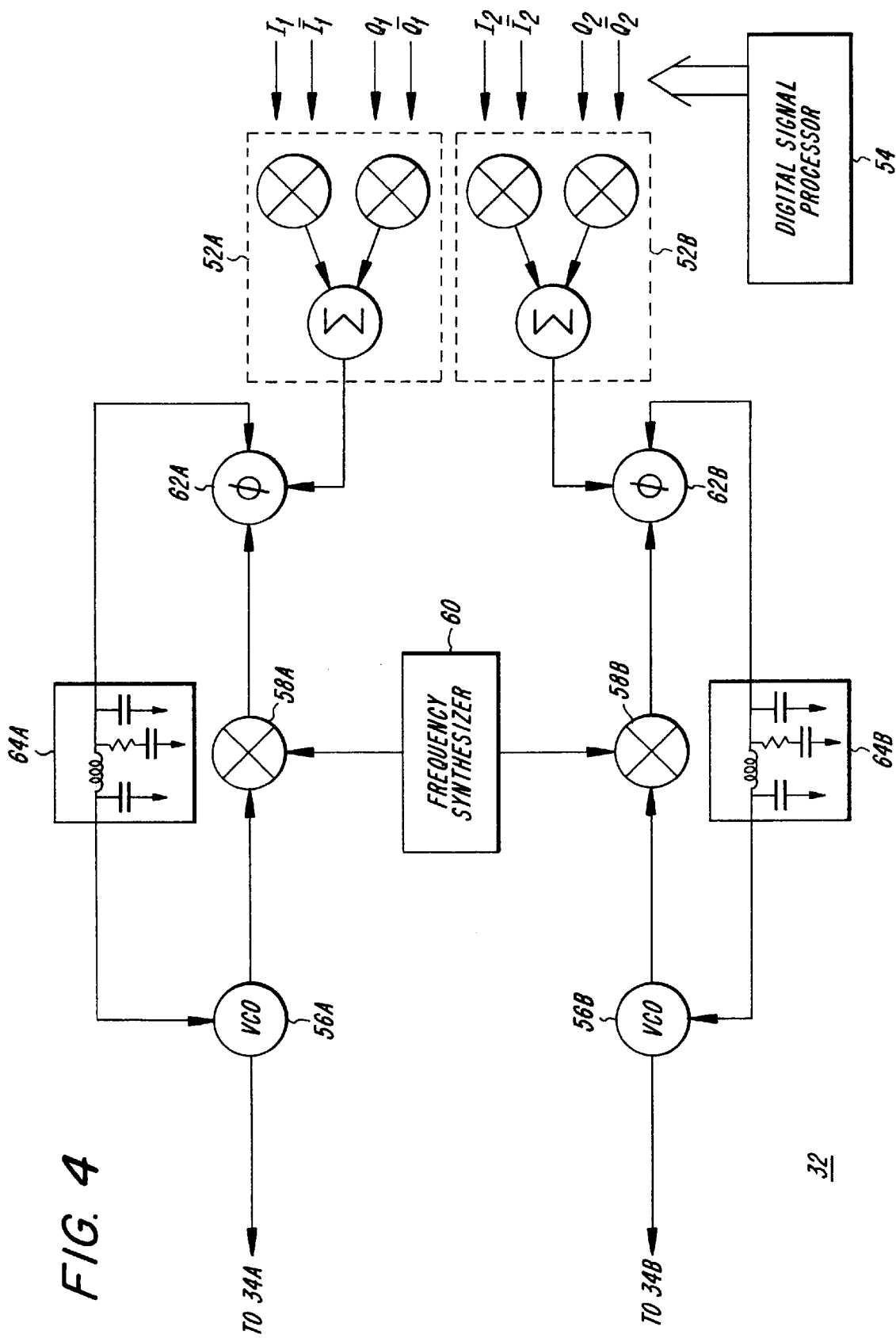
FIG. 4 is a block diagram of one embodiment of modulated signal generator used in the transmitter of FIG. 2 and 3.

Referring to FIG. 4 an exemplary block diagram of the modulated signal generator 32 that generates modulated signals of constant envelope (constant amplitude) is shown. Constant envelope modulation, in which information is conveyed by varying only the phase of the modulated signals, is preferred, because more efficient power amplifiers can be constructed for constant amplitude signals than for varying amplitude signals. The modulated signal generator 32 includes quadrature modulators 52A and 52B. The quadrature modulator 52A operates by multiplying an In-phase signal, with a instantaneous value of I, by a cosine wave at a chosen transmit intermediate frequency (TXIF). Similarly, the quadrature modulator 52B operates by multiplying a Quadrature signal, with instantaneous value of Q, by a sine component at the chosen TXIF. Preferably, the quadrature modulators 52A and 52B are balanced quadrature modulators that multiply the inverse of the In-phase and Quadrature signals ($\bar{I}$ and $\bar{Q}$) by the sine and cosine components as well. One such balanced quadrature modulator is disclosed in U.S. Pat. No. 5,530,722 issued to Dent, entitled "Quadrature Modulator with integrated distributed filters", which is hereby incorporated by reference. In this exemplary embodiment of the modulated signal generator 32, the balanced In-phase and Quadrature modulated signals are generated numerically with the help of a digital signal processor and delta-sigma modulators 54. The invention can make use of two such balanced quadrature modulators to generate the modulated signals applied to the power amplifiers 34A and 34B (shown in FIG. 1). Under this arrangement, the DSP 54 is programmed to provide the phase relationship of the modulated signals. The phase relationship of the modulated signals is determined by the two In-phase and Quadrature signals (I1,Q1) and (I2,Q2). These signals are shown in FIG. 4 as being applied to the quadrature modulators in a balanced form. For example, in order to provide a vertically polarized wave, the DSP 54 sets the quadrature phase relationship of the modulator signals to +90°. Conversely, to provide a horizontally polarized wave, the DSP 54 sets the quadrature phase relationship to -90°. It would be appreciated that the present invention can use modulated signals having a desired phase relationship by other means than the use of the quadrature modulators.

A first voltage controlled oscillator (VCO) 56A produces the first modulated signal, which is applied to the first power amplifier 34A. A part of the VCO output signal is down-converted to a lower intermediate frequency TXIF by heterodyne mixing in a mixer 58A, which receives a local oscillator signal from a frequency synthesizer 60. The TXIF signal is phase compared in a phase detector 62A with a modulated TXIF signal from the quadrature modulator 52A to produce a phase error signal. A phase error signal from the phase detector 62A, preferably, in the form of a current proportional to the phase error, is integrated and filtered by a loop filter 64A to produce a VCO control signal to the VCO 56A. The VCO control signal forces the phase of the first modulated signal to follow that of the modulated TXIF signal from the quadrature modulator 52A. A substantially identical arrangement comprising the VCO 56B, a mixer 58B, phase detector 62B and loop filer 64B forces the phase of the second modulated drive signal produced by the VCO 56B to follow that of the second modulated TXIF signal produced by the quadrature modulator 52B.

Figure 5:
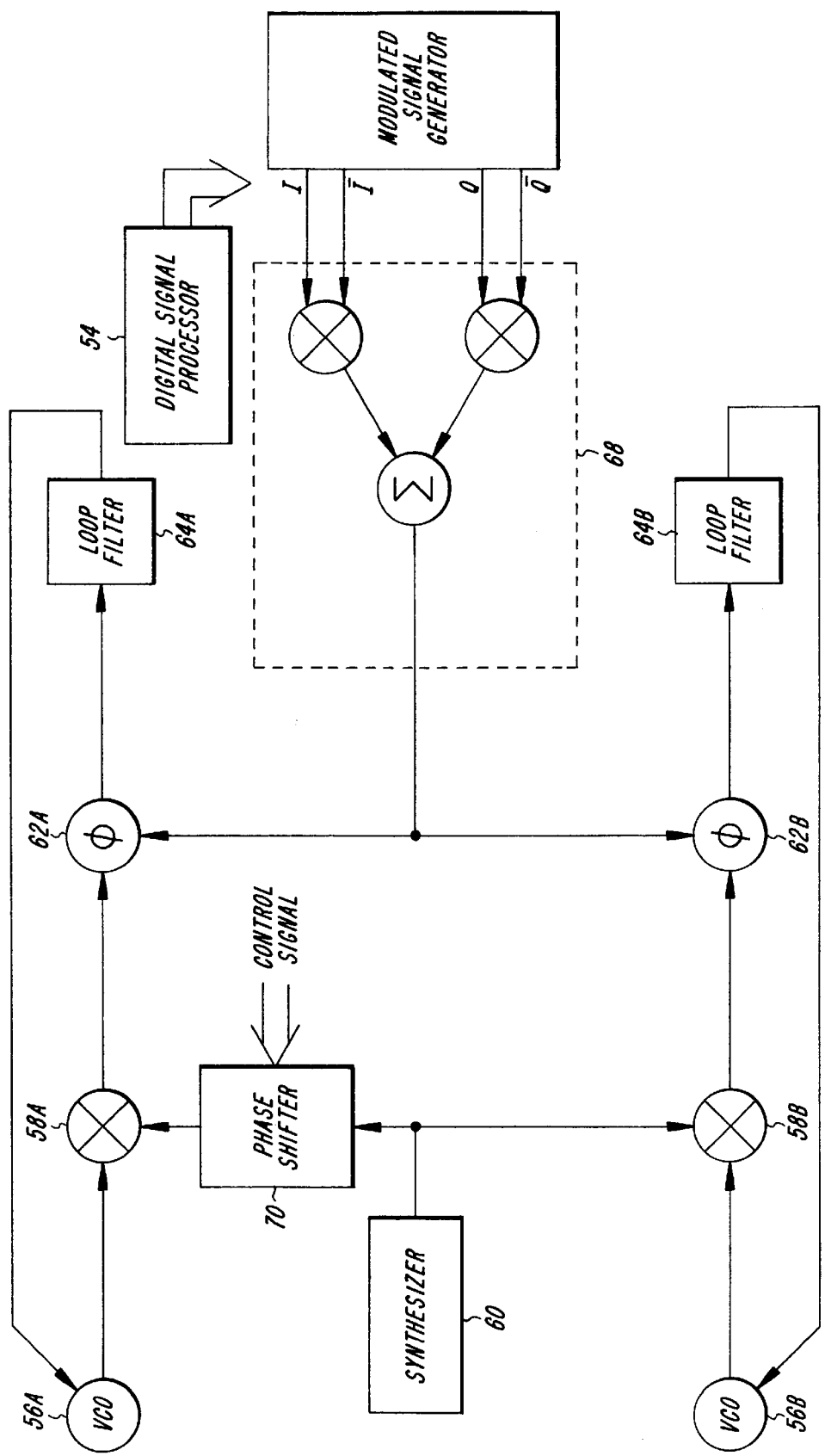
FIG. 5 is a block diagram of another embodiment of modulated signal generator used in the transmitter of FIG. 2 and 3.

Referring to FIG. 5, another embodiment of the modulated signal generator 32 is shown. Under this embodiment, a single balanced quadrature modulator 68 produces a TXIF signal modulated with I and Q signals. Under this arrangement, modulated signals from VCO's 56A and 56B are down-converted in mixers 58A and 58B against a local oscillator signal from the synthesizer 60. However, a phase shifter 70 is used to introduce a relative phase shift to one of the local oscillator signals, which is applied to the mixer 58A as compared to the other local oscillator signal, which is applied to the mixer 58B. The effect of the phase shifter 70 is to add an offset to the phase of the first modulated signal from the VCO 56A relative to the second modulated signal from the VCO 56B. Optionally, a second phase shifter (not shown) could be introduced between the synthesizer 60 and the mixer 58B to control the phase of the second modulated signal in the opposite sense to that of the phase shifter 70, which controls the phase of the first modulated signal. This arrangement produces double the relative phase shift, to maintain symmetry in the phase of the modulated signals. Alternatively, the synthesizer 60 may have two local oscillator signal outputs of variable relative phase, which can be produced by digital means within a frequency synthesizer using suitable digital divider chains and logic. A still further embodiment is to produce the desired relative phase relationship between the two modulated signals by incorporating a controlled phase shifter (not shown) in the path from the VCOs 56A and 56B to the mixers 58A and 58B. All such variations are considered to fall within the scope of the invention.

The arrangement of FIG. 4 is however preferred as it provides more accurate control of relative phase by means of digital generation of the signals I1,Q1,I2,Q2 by the DSP 54. Digital signal generation is preferred as it can be adapted to remove errors that can arise in practical implementations. Such errors can result in a polarization error such as a non-zero horizontal component when vertical polarization is selected, or vice versa. One method of detecting and correcting for modulation waveform errors is disclosed in U.S. Pat. No. 5,351,016, entitled "Adaptive self-correcting modulation system and method" which is hereby incorporated by reference.

Figure 6:
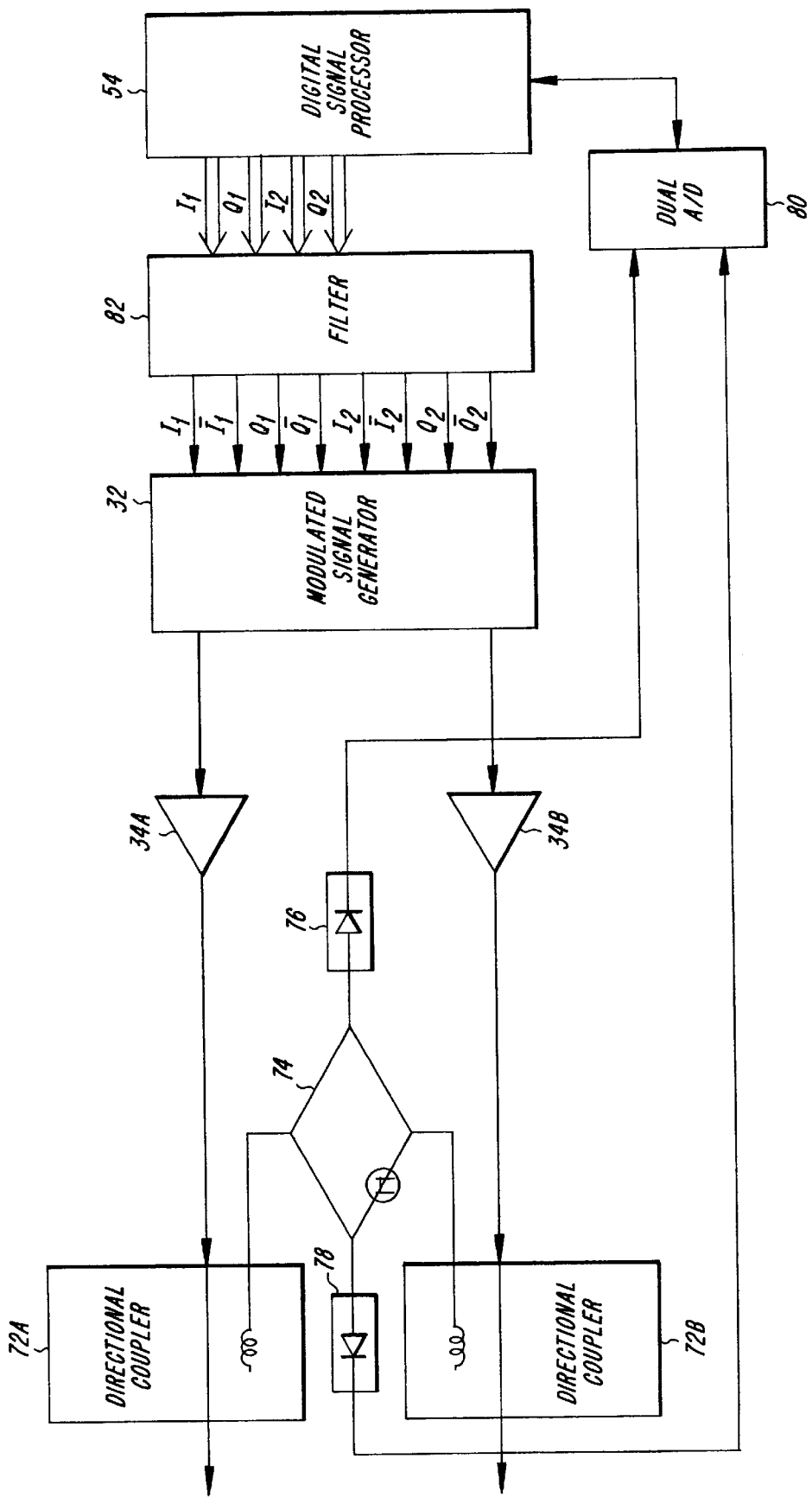
FIG. 6 is a block diagram of another embodiment of a transmitter according to the invention.

Referring to FIG. 6, another embodiment of the transmitter of the invention is shown. Under this embodiment, the transmitter detects and corrects for polarization errors by suppressing a wave of undesired polarization. Directional couplers 72A and 72B take samples of respective outputs of the amplifiers 34A and 34B. A hybrid coupler 74 determines the sums and the difference of the samples. The sum is detected using a rectifier detector 76 to produce a signal approximately proportional to one polarization component (e.g. Vertical), while the difference is detected using another rectifier detector 78 to produce a signal approximately proportional to the other polarization component (e.g. Horizontal). The rectified signals, which may be smoothed if necessary, are converted, using a dual analog to digital converter 80, to produce digital signals that can be processed by the digital signal processor 54. The DSP 54 uses these fed back signals to adjust the I1,Q1,I2,Q2 signals, which are fed to a filter 82 so as to cancel or suppress the undesired polarization component. The filter 82 according to a preferred implementation converts binary digital words representing the I1,I2,Q1,Q2 signals from the DSP 54 to high bit-rate complementary I and Q streams which are filtered by balanced filters to produce suitable signals for the quadrature modulators 52A and 52B (shown in FIG. 4) of the modulated signal generator 32.

From the foregoing description it would be appreciated that the transmitter of the present invention eliminates the need for a polarization switch to switch a single power amplifier from one antenna feed port to another of opposite polarization. In addition, the effective transmit power at the selected polarization is, when using the invention, equal to the sum of the powers of the first and second power amplifiers so that each may be of half the desired total transmit power level compared to prior art solutions.

It will be appreciated by those of ordinary skill in the art that the present invention can be embodied in other specific forms without departing from the spirit or essential character thereof. Presently disclosed embodiment are therefore considered in all respects to be illustrative and not restrictive. The scope of the invention is indicated by the appended claims, rather than the foregoing description, and all changes that come within the meaning and range of equivalent thereof are intended to be embraced therein.

What is claimed is:

1. A transmitter for transmitting a modulated signal wave having a linear polarization of selected orientation comprising:

a first antenna feed and a second antenna feed;

a first power amplifier connected to the first antenna feed point for amplifying a first modulated signal and radiating it with a first polarization;

a second power amplifier connected to the second antenna feed for amplifying a second modulated signal and radiating it with a second polarization; and signal generator means for generating said first and second modulated signals with a relative phase relationship selected such that said signals radiated with said first and second polarization, are equivalent to a polarized wave having a third polarization.

2. The transmitter of claim 1, wherein the power level of transmission of said wave of third polarization is equal to the sum of the powers of said first and second power amplifier.

3. The transmitter of claim 2, wherein the power outputs of the power amplifiers are equal.

4. The transmitter of claim 1, wherein said first and second polarizations are circular polarizations and said third polarization is vertical or horizontal linear polarization.

5. The transmitter of claim 1, wherein said first and second are linearly polarized waves with orientations of ±45° relative to vertical, respectively.

6. The transmitter of claim 1, wherein the orientation of the linearly polarized wave is vertical.

7. The transmitter of claim 1, wherein the orientation of the linearly polarized wave is horizontal.

8. The transmitter of claim 1 further including a controller for selecting the orientation of the linearly polarized wave by selecting said relative phase relationship.

9. The transmitter of claim 1, wherein said first and second polarizations are linear polarizations and said third polarization is right or left-hand circular polarization.

10. A transmitter, comprising:
   a first antenna feed coupled to a first modulated signal for producing a first polarized wave having a first non-linear polarization;
   a second antenna feed coupled to a second modulated signal for producing a second polarized wave having a second non-linear polarization;
   a modulated signal generator for generating said first modulated signal and said second modulated signal, the modulated signal generator being responsive to a control signal for selecting a relative phase relationship between the first and second modulated signals such that a modulated signal is radiated as a wave having a linear polarization of a desired orientation of polarization.

11. The transmitter of claim 10, wherein the first antenna feed is coupled to the second modulated signal via a first power amplifier having a first gain, and the second antenna feed is coupled to the second modulated signal via a second power amplifier having a second gain.

12. The transmitter of claim 10, wherein the wave is radiated with a power that corresponds to the sum of the first gain and the second gain.

13. The transmitter of claim 10, wherein said linear polarization orientation is vertical.

14. The transmitter of claim 10, wherein said linear polarization orientation is horizontal.

15. A transmitter for transmitting signals of a selected polarization in a Time Division Multiple Access system having a number to time-slots allocated for transmission, comprising:
   a modulated signal generator that generates modulated signals having a phase relationship with respect to each other selected for each allocated time-slot;
   power amplifiers for amplifying the modulated signals to a transmit power level;
   antenna feeds coupled to said power amplifiers to radiate radio waves corresponding to the amplified modulated signals having a up/ down-ramping controller that activates and deactivates the power amplifiers in synchronism such that the transmission in each of said allocated time-slots occurs with a polarization allocated for the time-slot.

16. The transmitter of claim 15, wherein during a first time-slot, transmission occurs with a first selected polarization and during a second time-slot, transmission occurs with a second selected polarization.

17. The transmitter of claim 16, wherein the first selected orientation is horizontal and the second selected orientation is vertical.

18. A transmitter, comprising:
   antenna feeds that generate orthogonally polarized radio waves corresponding to a first and second modulated signal respectively; and
   a modulated signal generator that generates said first and second modulated signals with a selectable phase relationship with respect to each other such that a wave is transmitted with a linear polarization having a selected orientation.

19. The transmitter of claim 18 further including power amplifiers for amplifying said modulated signals, wherein the transmitter transmits the linearly polarized wave of selected orientation with a power that corresponds to the sum of the power outputs of the power amplifiers.

20. The transmitter of claim 19, wherein the power outputs of the power amplifiers are equal.

21. The transmitter of claim 18, wherein said orthogonally polarized waves are linearly polarized waves.

22. The transmitter of claim 18, wherein said orthogonally polarized waves are circularly polarized waves.

23. The transmitter of claim 18 further including a controller for selecting the orientation of said linearly polarized wave by controlling said selectable phase relationship.

24. The transmitter of claim 18, wherein the antenna feeds provide said orthogonally polarized waves with linear polarization at an angle of 45° relative to an axis of said selected orientation.

25. A transmitter for transmitting a wave of desired polarization and suppressing a wave of undesired polarization, comprising:
   a first power amplifier means for amplifying a first modulated signal to a first amplified signal;
   a second power amplifier means for amplifying a second modulated signal to a second amplified signal;
   coupling means for coupling said first amplified signal to a first antenna feed for transmitting said first amplified signal with a first polarization and for coupling said second amplified signal to a second antenna feed for transmitting said second amplified signal with a second polarization, said coupling means also providing attenuated sampled outputs corresponding to said first and second amplified signals; and
   combining means for combining said sampled outputs to provide a sample of the signal transmitted with said undesired polarization;
   signal generator means responsive to said sample of the undesired polarization signal for generating said first and second modulated signals such that a wave jointly transmitted from said first and second antenna feed point has a desired polarization by controlling the amplitude and phase of said modulated signals such that said undesired polarization signal sample is of minimum amplitude.

\* \* \* \* \*